US008874108B2

(12) United States Patent
Orton et al.

(10) Patent No.: US 8,874,108 B2
(45) Date of Patent: Oct. 28, 2014

(54) INTEGRATING MOBILE DEVICES INTO A FIXED COMMUNICATION INFRASTRUCTURE

(71) Applicant: Amadeus S.A.S., Sophia Antipolis (FR)

(72) Inventors: David Orton, Bucks (GB); Julien Dersy, Guilford (GB); Milan Sheth, London (GB); Vincent Domurado, London (GB)

(73) Assignee: Amadeus S.A.S., Biot (FR)

( * ) Notice: Subject to any disclaimer, the term of this patent is extended or adjusted under 35 U.S.C. 154(b) by 35 days.

(21) Appl. No.: 13/721,578

(22) Filed: Dec. 20, 2012

(65) Prior Publication Data
US 2014/0179313 A1 Jun. 26, 2014

(51) Int. Cl.
H04W 4/00 (2009.01)
H04W 64/00 (2009.01)
H04W 60/04 (2009.01)
H04W 60/06 (2009.01)

(52) U.S. Cl.
CPC ............ *H04W 64/00* (2013.01); *H04W 64/003* (2013.01); *H04W 60/04* (2013.01); *H04W 60/06* (2013.01)
USPC .................. 455/435.1; 455/456.1; 455/456.2; 455/456.3; 455/456.5; 455/456.6

(58) Field of Classification Search
CPC ... H04W 64/003; H04W 64/00; H04W 60/04; H04W 60/06; H04W 4/02; H04W 4/021
USPC .......... 455/435.1, 456.1, 456.2, 456.3, 456.5, 455/456.6
See application file for complete search history.

(56) References Cited

U.S. PATENT DOCUMENTS

| 6,094,640 | A  | 7/2000 | Goheen |
| 7,716,335 | B2 | 5/2010 | Dinker et al. |
| 7,797,585 | B1 | 9/2010 | Sahin et al. |

(Continued)

FOREIGN PATENT DOCUMENTS

| EP | 2254080 A1 | 11/2010 |
| WO | 2009098712 A2 | 8/2009 |
| WO | 2010133420 A1 | 11/2010 |
| WO | 2012072862 A1 | 6/2012 |

OTHER PUBLICATIONS

European Patent Office, Search Report issued in European Application No. 12290450.1 dated May 10, 2013.

(Continued)

*Primary Examiner* — Khai M Nguyen
(74) *Attorney, Agent, or Firm* — Wood, Herron & Evans, LLP

(57) ABSTRACT

Systems, methods, and computer program products for use with a wireless communication network. A fixed communication network includes a device server and a fixed information technology (IT) device coupled with the device server. A mobile communication device is coupled by the wireless communication network with the device server and with the IT device. The device server is configured to store identification information for the IT device. The mobile communication device is configured to determine a current location of the mobile communication device, to request the identification information for the IT device from the device server over the wireless communication network, to receive the identification information for the IT device over the wireless communication network from the device server, and to transmit a service request, based upon the identification information, over the wireless communication network to the IT device.

27 Claims, 11 Drawing Sheets

(56) References Cited

U.S. PATENT DOCUMENTS

| | | |
|---|---|---|
| 7,809,525 B2 | 10/2010 | Chagoly et al. |
| 7,822,844 B2 | 10/2010 | Oulu et al. |
| 2007/0244966 A1* | 10/2007 | Stoyanov et al. ............ 709/204 |
| 2008/0021994 A1 | 1/2008 | Grelewicz et al. |
| 2008/0133336 A1* | 6/2008 | Altman et al. ................. 705/10 |
| 2010/0046152 A1 | 2/2010 | Ghobrial et al. |
| 2010/0293386 A1 | 11/2010 | Kezzou et al. |
| 2010/0318387 A1 | 12/2010 | Kishore et al. |
| 2011/0081919 A1* | 4/2011 | Das et al. ................. 455/456.1 |
| 2012/0011499 A1* | 1/2012 | Conover et al. .................. 718/1 |
| 2012/0172062 A1* | 7/2012 | Altman et al. ................ 455/457 |
| 2013/0288704 A1* | 10/2013 | Wirola et al. ............. 455/456.1 |
| 2014/0073363 A1* | 3/2014 | Tidd et al. ................. 455/456.5 |
| 2014/0113613 A1* | 4/2014 | Huang et al. .................. 455/418 |

OTHER PUBLICATIONS

European Patent Office, International Search Report and Written Opinion issued Feb. 21, 2014 in International application No. PCT/EP2013/003801.

* cited by examiner

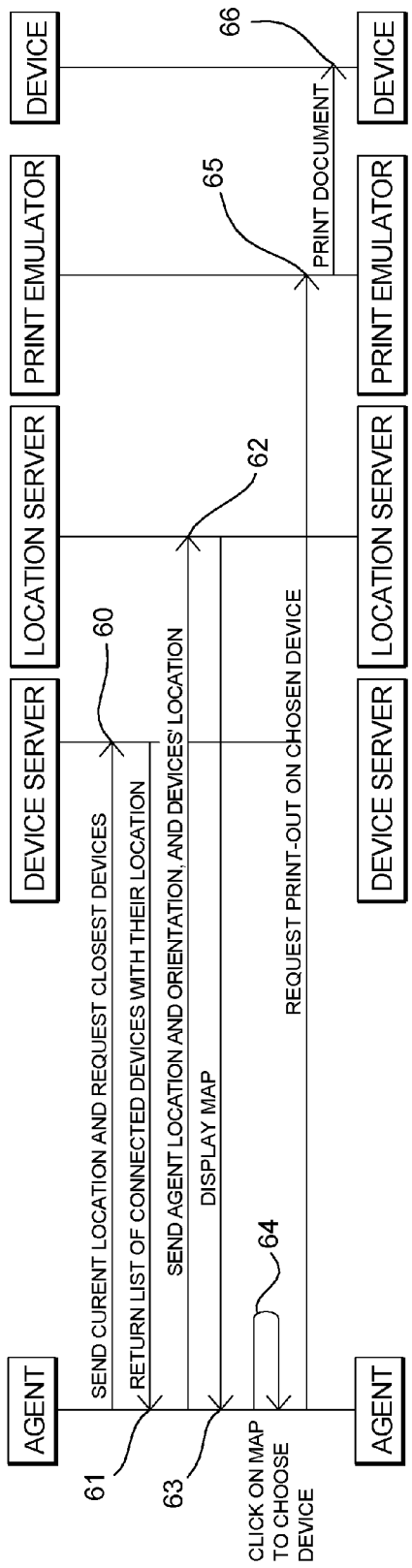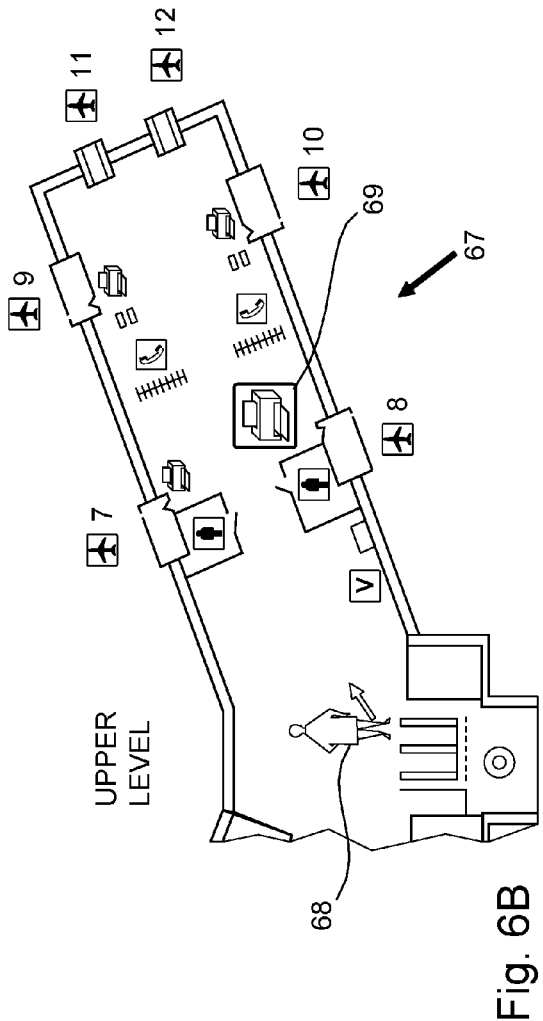

INTEGRATING MOBILE DEVICES INTO A FIXED COMMUNICATION INFRASTRUCTURE

FIELD OF THE INVENTION

The present invention is directed to the field of communication technology and, more specifically, to the integration of mobile communication devices into a fixed communication environment or infrastructure.

BACKGROUND

Several types of communication networks are known. For example, typical local area networks are based on fixed communication infrastructure such as stationary workstations, servers and cable connections. Mobile networks such as networks according to the GSM, UMTS or LTE specifications enable mobile communication by use of mobile communication devices. Wireless communication infrastructures, e.g., implementing the IEEE 802.11 specification, facilitate short-range mobile communication.

SUMMARY OF THE INVENTION

According to an embodiment of the invention, a method of utilizing a mobile communication device in a fixed communication infrastructure is provided. The fixed communication infrastructure comprises at least one device server and a plurality of fixed information technology (IT) devices which are coupled to the at least one device server. The mobile communication device is coupled by a wireless communication link to the fixed communication infrastructure. The respective locations of the fixed IT devices are recorded by the device server. The mobile communication device determines its current location and requests identification information of at least one fixed IT device which is located within its vicinity from the device server via the wireless communication link. Then, the mobile communication device receives the requested identification information from the device server. Subsequently, the mobile communication device transmits a request to a fixed IT device identified by the device server and the fixed IT device serves the request.

By this, the mobile communication device gets knowledge about the fixed IT devices in its vicinity and can utilise the infrastructure of the fixed communication network.

According to another aspect, a corresponding heterogeneous information technology network is provided.

According to an embodiment of the invention, a method is provided for coupling a mobile communication device with a fixed communication network including an information technology (IT) device. The method includes determining a current location of the mobile communication device, and requesting, at the mobile communication device, identification information for the IT device from a device server over a wireless communication network. The method further includes receiving the identification information for the IT device at the mobile communication device over the wireless communication network from the device server. Based upon the identification information, a service request is transmitted from the mobile communication device over the wireless communication network to the IT device.

According to an embodiment of the invention, a system is provided for use with a wireless communication network. The system includes a fixed communication network comprising a device server and a fixed information technology (IT) device coupled with the device server, and a mobile communication device coupled by the wireless communication network with the device server and with the IT device. The device server is configured to store identification information for the IT device. The mobile communication device is configured to determine a current location of the mobile communication device, to request the identification information for the IT device from the device server over the wireless communication network, to receive the identification information for the IT device over the wireless communication network from the device server, and to transmit a service request, based upon the identification information, over the wireless communication network to the IT device.

BRIEF DESCRIPTION OF THE FIGURES

The present invention will be described with reference to the accompanying figures. Similar reference numbers generally indicate identical or functionally similar elements.

FIGS. 6A and 6B show an exemplary utilization of a fixed device by a mobile communication device using a map.

Figure 1:
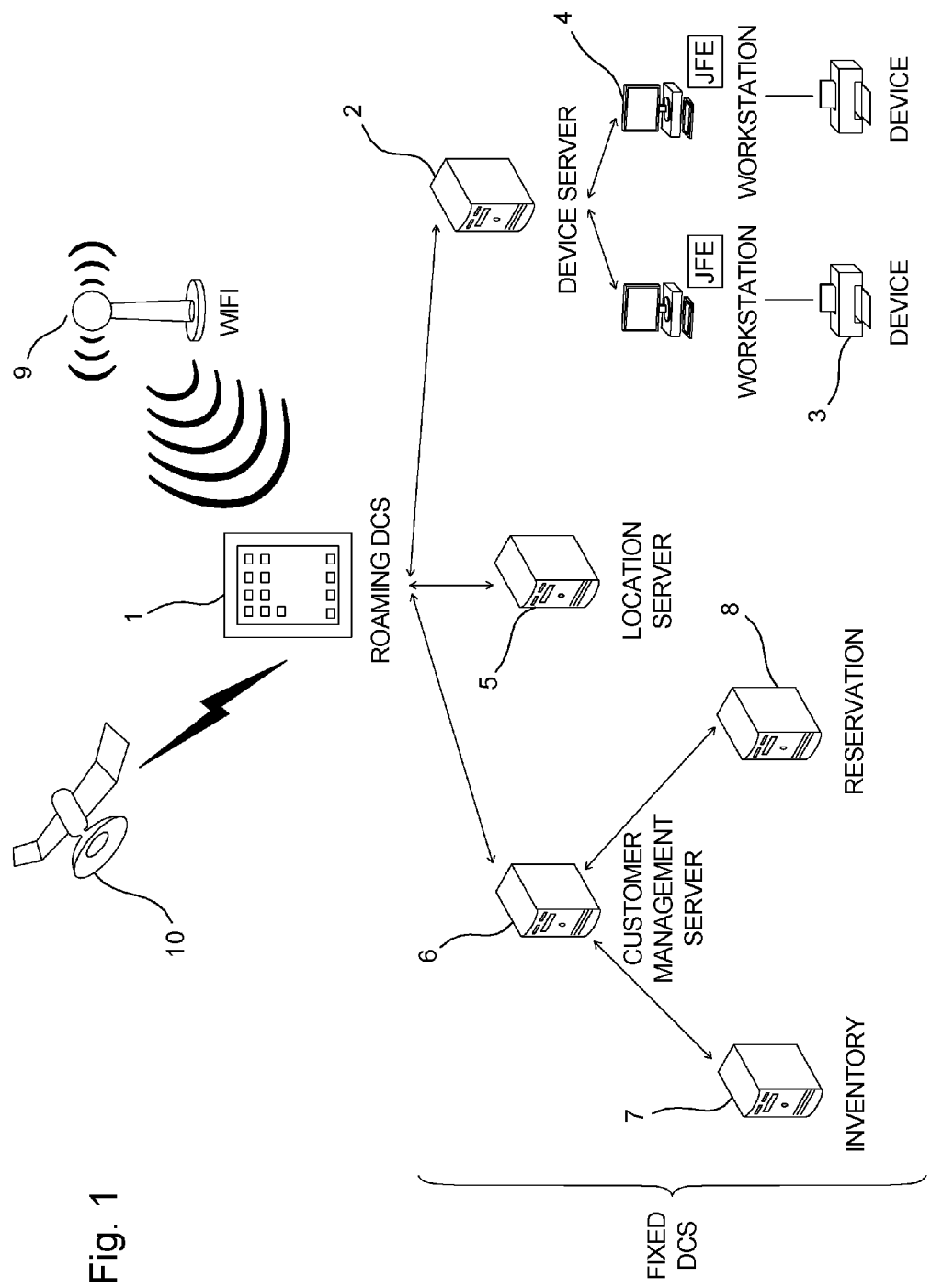
FIG. 1 illustrates an example of the architecture of the present communication system.

The drawings and the description of the drawings are of examples of the invention and not of the invention itself.

DETAILED DESCRIPTION

Before turning to the detailed description on the basis of the figures, a few more general aspects will be set forth first.

Hitherto, fixed communication networks and mobile communication networks are basically two separate worlds. On the one hand, fixed communication networks comprising stationary workstations and fixed infrastructure such as servers and cable connections are often employed in companies, offices, public authorities or buildings used by the public or accessible by customers in the form of local area networks (LANs). Employees, staff personal, agents and other working people normally work in a stationary manner by using stationary computer workstations at a particular place. However, for several types of such operable fixed communication networks, there is an increasing need for enabling users to fulfil their duties in a mobile manner, independent from a stationary workplace. For example, staff members serving customers at different places throughout larger building complexes or areas such as airports, railway stations, shopping malls, public authorities and the like increasingly need to be able to access information when they are under way.

On the other hand, public mobile communication networks, e.g., according to the GSM, UMTS or LTE standard, or other wireless communication networks such as WLAN/Wi-Fi networks support communication of mobile devices. However, these networks are generally not integrated with a company, office or authority local area network. Thus, typically, interaction between mobile communication devices on the one hand and the servers and stationary workstations of a local fixed communication network is not supported, neither by the infrastructure of a mobile communication network nor by the infrastructure of the fixed communication networks.

Thus, there is a need to systematically integrate these types of networks in order to enable user to execute their workflows independent from a stationary workplace.

The present invention proposes to couple mobile communication devices with a fixed communication network. The mobile communication devices may be tablet computers, mobile terminals, smartphone, laptops/notebooks or any kind of other suitable mobile devices. The fixed communication network includes at least one device server and a plurality of fixed IT devices such as workstations, printers, scanners, barcode readers, information displays, facsimile devices, copiers, self-service customer stations and so on. The device server is arranged to record the locations of the fixed IT devices and, thus, maintains a location inventory of the stationary elements of the fixed communication network. The mobile communication devices can benefit from this inventory while they are moving through the area at which the fixed communication infrastructure is deployed as they are capable of having any kind of services executed at a certain fixed IT device in the following way.

A particular mobile communication device determines its current location. The determination is, for example, either performed by using a Global-Position-System (GPS)-like system or, due to ineffective satellite coverage in buildings, by localization techniques implemented in mobile or wireless communication systems such as triangulation. The mobile communication device transmits its current location to the device server and requests identities of one or several fixed IT devices in the vicinity. The request may be limited to a particular type of fixed IT device such as workstations or printer.

The communication between the mobile communication device and the device server is performed by a wireless link, e.g., by using Wi-Fi or a 2G/3G/4G connection. Therefore, the area at which the fixed communication network is deployed is also equipped with wireless or mobile communication infrastructure such as Wi-Fi access points or 2G/3G/4G base stations (the latter one may either be base stations of a public network operator such as Vodafone, Orange, T-Mobile, Telefónica, AT&T, Verizon, etc. or a microcells/picocells/femtocells operated by the operator of the local fixed communication network). The mobile communication infrastructure is connected with the fixed communication network infrastructure in order to enable communication between the mobile communication device, the device server and any other entity of the fixed communication network.

In response to the request by the mobile communication device to identify fixed IT device in the vicinity (i.e., in close range to the mobile communication device), the device server transmits the requested identification information to the mobile communication device. The identification information includes, for example, a device ID and a location of the at least one fixed IT device. After having received the identification information, it is preferably presented to the human user of the mobile communication device. In case the device server has returned identity information regarding more than one fixed IT device, either the human user or the mobile communication device automatically selects one preferred fixed IT device. A criterion for the automatic selection could, for example, be the distance of the mobile communication device to the fixed IT device, i.e., the closest fixed IT device is selected.

After a particular fixed IT device is identified, the mobile communication device transmits a request to the fixed IT device. Similar to the communication with the device server, also this communication with the fixed IT device is performed over the wireless communication link. The request transmitted to the fixed IT device may be any kind of request for processing a service, including a request to print out a particular document (in which case the request will either be directed to a print driver of a workstation having a peripheral printer or to a network printer), to process and return information, to display information to the user of the fixed IT device (in which case the request includes the transmission of a message to be displayed), etc. After the fixed IT device has received the request, it processes it. For example, in case of a print request, the respective document is printed. Subsequently, the user of the mobile communication device can physically walk to the fixed IT device and get the paper version of the printed document.

Hence, the device server and its inventory of the fixed IT devices enable a utilization of the fixed IT devices by the mobile communication device.

Optionally, the fixed communication network has a location server which is responsible for tracking the (current) locations of the mobile communication devices in the area. This supports further workflows and use-cases such as supervision of staff personal equipped with the mobile communication devices. Location tracking by the location server includes the mobile communication device registering itself with an identification and its current location at the location server. The registering occurs after the mobile device is activated, after the user has logged in the operating system, after the wireless communication link has been activated or after an application or service connecting the mobile device to the fixed communication infrastructure has been started. The mobile communication device updates its location with the location server every time its location has changed to at least a predetermined extent. The detection of such a significant location change can be performed locally at the mobile communication system, e.g., by a locally installed location tracking application monitoring the movement of the mobile communication device (commercially available tablets and smartphones regularly come with such applications already pre-installed or such application are available in respective application stores for download and installation). Additionally or alternatively, the mobile communication device uses GPS and/or 2G/3G/4G localization mechanisms such as triangulation or Observed Time Difference techniques to keep track of its location changes.

Optionally, one or more mobile communication devices may act as a supervising station. Additionally or alternatively, a supervisor may also use a fixed IT device such as a workstation. Due to the integration of the mobile communication devices into the fixed communication network, a supervisor—provided with the respective permission rights—is capable of monitoring and instructing the (non-supervising) mobile communication devices. To do this, the supervising station requests the location of mobile communication devices being registered with the location server. The request is directed to the location server and includes either a location or an identity of a particular mobile communication device to be tracked. In case of the request including a location, the location server may return a list of mobile communication devices being located at or around the specified location. If the request includes a mobile communication device's identity, the location server will return the location of the specific mobile communication device. After having the mobile communication device(s) and their/its location(s) identified, the supervisor may execute subsequent workflows with the identified mobile communication devices such as sending them messages, generating statistics about the locations and the like.

According to one optional arrangement, the fixed communication network is a Departure Control System which is implemented at an airport. In this environment, airport or airline staff members moving through the airport or appointed to varying locations such as check-in halls, security check entrances, boarding gates, information desks etc. are equipped with tablet computers or smartphones as mobile communication devices. The constraints of being tied to the fixed IT infrastructure in place such as workstations and printers at boarding gates and desks are reduced or overcome by the methodologies presented herein. For example, an airline agent is able to access DCS information such as customer lists, flight and boarding status, to print documents such as new boarding passes and provide passengers with helpful information from anywhere on the move. From the perspective of a supervisor, it is possible to deploy, monitor and instruct staff members efficiently.

The present invention is, however, not limited to employment at an airport. Rather, it is possible to implement it in many other environments such as other travel infrastructure such as railway stations or bus terminals, shopping infrastructure such as shopping malls or supermarkets, public buildings such as governmental agencies or authorities, hotels, company networks, university campuses, schools and so on.

Further value is added to the user by enhancing the presentation of information at the mobile communication device. Optionally, two sophisticated ways of information presentation, also referred to as "augmented reality", are discussed herein. A map-based approach displays a map of the environment including the location of fixed IT devices, of other mobile communication devices and of other points of interest in the vicinity. In this case, the location server maintains maps of the area and is arranged to respond to inquiries by the mobile communication devices to transmit map data. A camera-based approach allows overlaying a virtual layer of information over a picture generated by the mobile communication device's camera. Both approaches can also be implemented without the device server described above.

According to the map-based augmented reality approach, the identification and selection of a fixed IT device and transmission of the request to the selected fixed IT device can be made more user-friendly. The mobile communication device sends its current location, its current orientation and the location of the at least one fixed IT device identified by the device server to the location server. The location server responds with map information regarding the mobile communication device and the at least one fixed IT device identified by the device server. With this information, the mobile communication device is able to display a map indicating its current location and/or the location of the at least one fixed IT device identified by the device server and/or the location of other mobile communication devices at or around a particular location. For example, the map representation enables the user of the mobile communication device to conveniently select a particular fixed IT device and to issue the transmission of the request to the particular fixed IT device.

Furthermore, the map-based augmented reality approach can be used to provide a navigation means to navigate throughout the area or to provide navigation assistance to customers. The mobile communication device transmits a request for navigation from its current location to a point of interest to the location server. The location server computes an itinerary comprising intermediate points to the destination and walking/driving time information. It then returns the requested navigation information and respective map information to the mobile communication device which displays a map to the user. The map indicates the current location of the mobile communication device, optionally the location of any fixed IT devices, the location of the point of interest (i.e., the destination) and additional navigation information such as walking directions and times.

In order to support the camera-based augmented reality approach, the mobile communication device is equipped with a camera. The camera-based approach supports navigation assistance as well as information provision to the user.

According to one optional workflow, the mobile communication device—after having activated its camera—transmits its current location and its current orientation to the location server. The location server returns location information regarding one or more points of interests, such as their distance and their directions from the current location of the mobile communication device. The mobile communication device displays a still or video picture taken by its camera and superimposes a virtual representation of the location information regarding the points of interest received from the location server. The user can use the combination of camera picture and the layer of superimposed information to conveniently navigate to the respective point of interest.

Similarly, the camera-based augmented reality approach is useful to present location-specific information to the user. The location-specific information may, for example, be kept in a content management server which is part of the fixed IT network infrastructure. The mobile communication device—after having activated its camera—is directed at a particular point of interest. It then requests content information related to the point of interest from the content management server. The content management server returns the requested content information to the mobile communication device. The mobile communication device superimposes a virtual representation of the content information over the point of interest which is represented as a part of the still or video image taken by the mobile communication device's camera.

A user such as an airline or handler employee, agent or any other member of a working staff is, thus, enabled to fulfil his/her duties independent from a fixed communication. The functions and techniques presented herein support, for example, the following work flows and activities.

The user collects a mobile communication device, e.g., a tablet computer, at the beginning of his shift. The user logs in to the network, which includes a registration with the location server and access to any other function or service provided by the network (e.g., access to data bases, electronic mail, messaging etc.) according to her/his profile via a wireless connection.

The user performs activities related to her/his working processes while on the move through the area covered by the wireless infrastructure of the network, e.g., throughout an airport, a railway station, a public authority, a supermarket, a restaurant and the like. For example, the user may print documents either by manually selecting a printer via the GUI of her/his mobile communication device, by scanning a barcode attached to the printer, or through automatic selection of the most convenient printer based on determination of the closest device(s) to the moving user supported by the system. As another example, through location-sensing by and/or augmented reality functionality of the mobile communication device, the user may be presented with a view of statuses and activities according to her/his location, e.g., a flight supervisor that is managing several flights will be automatically provided and presented with information related to flight A when s/he is close to the gate to which flight A is assigned. As another example, the user may use barcode reading functionality and NFC readers on her/his tablet computer to scan documents, products and data sources such as supermarket products, boarding passes, menu items on a restaurant menu card etc. At yet another example, the user may register the location of a fixed IT device such as a printer by either entering its full location or scanning a bar code attached with the fixed IT device.

Now turning to the more detailed description, FIG. 1 shows an example of a schematic view of an integrated communication system. In the example of FIG. 1, the mobile communication device 1 is a tablet computer which is considered to be a mobile part of a Departure Control System (DCS) implemented at an airport. The mobile communication device 1 is enabled to access the fixed part of the network, in particular device server 2, location server 5 and customer management server 6, by use of an application installed on it which is designated as "Roaming DCS". By this, it allows a staff member equipped with it to "roam" through the airport. Of course, the mobile communication device may also be any other kind of a "smart" mobile terminal such as a smartphone, a notebook or laptop, netbook, ultrabook and the like. Preferably, but not necessarily, it is equipped with features like orientation determination and a camera in order to support augmented reality services (which will be described in more detail further below).

By being connected by at least one radio interface to a short-range wireless communication system such as a Wi-Fi network 9 and/or a mobile communication network such as a GSM, UMTS or LTE network (not shown), the mobile communication device 1 is able to communicate with the fixed part of the network. The message flows for integrating the mobile communication device 1 to the fixed DCS will be described in detail further below.

In addition, these radio interfaces and a connection to a GPS-like positioning system enable the mobile communication device 1 to determine its location. For determining its position by using GPS, the mobile communication device 1 is equipped with a GPS module arranged to establish a connection to a GPS satellite, to transmit a location request to the satellite and to receive the response from the satellite including the requested location information. The location determination based on the Wi-Fi network 9 or the mobile communication network is either performed by using triangulation techniques such as an Observed Time Difference method or similar to GPS, i.e., the mobile communication device 1 transmits a location request to the access point(s) and/or base station(s) and receives the respective location information (provided that the access point(s) and/or base station(s) have knowledge of their locations) or a combination of such technologies.

The fixed part of the network depicted by FIG. 1 includes at least one device server 2, at least one location server 5 and management servers such as the customer management server 6, an inventory managing entity 7 or reservation infrastructure 8. The device server 2 manages the fixed IT devices, in particular stationary workstations 4 such as Personal Computers which may run on COTS operating systems and provide a user interface for the stationary staff, e.g., a Journey Front-End (JFE) for managing air travel tasks. Peripheral devices 3 connected to the workstations 4 such as printers, scanners, screens and other devices, in particular airport and flight gate equipment such as barcode and passport readers, self-service printers, self-service terminals, workstation-independent monitors such as information displays, TVs, etc. are also considered to be fixed IT device. In particular, the device server 2 holds an inventory of the fixed IT devices 3 and 4 of the DCS including identity information and their locations at the airport area. More specifically, this location information may include airport location identifiers which use natural language descriptors to classify location (and therefore correspond to 'symbolic locations' as used for passenger operations), e.g., airport or city (e.g., "London Heathrow" or "LHR") at the first level, terminal or building at the second level, location category (e.g., gate, check-in area) at the third level of description; 3D geospatial coordinates; workstation IDs, e.g., in line with the above three-level hierarchy (e.g., "A/LHR/T/1/CKI/5/3"), etc.

Device server 2 is arranged to manage this inventory of the fixed IT devices 3 and 4, i.e., to include new devices into the inventory, to update the location of an existing device 3, 4 (if a device is moved to another location) and to delete devices from the inventory. As the infrastructure of the fixed part of the DCS generally stands, the inventory of the device server 2 is normally rather static. In particular, device server 2 is arranged to respond to requests by mobile communication devices 1 concerning the position of fixed IT devices 3 and 4, as will be described in more detail further below. If an asset database of the fixed network (such as a directory server, domain controller or the like) exists, the device server 2 may be connected to and synchronize with it.

Location server 5 is, on the one hand, responsible for managing the current locations of the mobile communication devices 1 "roaming" through the airport area. Similar to the device server 2, it maintains an inventory of the mobile communication devices including at least respective identity information and their current locations. Compared to the fixed IT devices inventory of the device server 2, however, the register of the location is generally more dynamic as registration changes and location updates of the mobile communication devices 1 occur more often.

On the other hand, location server 5 may also maintain a repository of maps of the area at which the fixed network is deployed and in which the mobile communication devices 1 move around. In the present example of an airport DCS, location server 5 thus keeps maps of the airport, its buildings and zones and points of interests such as check-in desks, self-service check-in kiosks, boarding gates, transfer desks, etc. The maps can either be created proprietarily, may be obtained from third parties (e.g., from Google) or may already be available from the operators of the fixed network themselves (i.e., in the present example, from the airport operator). In the latter cases, synchronisation with the third party or operator source is desirable in order to keep the maps up-to-date.

The location server 5 is arranged to compute the position of roaming agents equipped with mobile communication devices 1 and to display them on the map. It also keeps information about the position of agents on the move such as agent ID and role; mobile communication device ID; current zone; 3D geospatial coordinates, etc.

The customer management server 6 provides the back-end of a customer management application. The customer management server 6 is responsible for processing user queries and provides interfaces to further services and products such as inventory managing entity 7 and reservation infrastructure 8.

In order to integrate mobile and stationary components of the network depicted by FIG. 1, besides the location management of the mobile communication devices 1, a respective location repository of the fixed IT devices is required. As opposed to mobile communication devices 1 which usually provide interfaces to access the spatial position either from GPS services or based on triangulation of Wi-Fi/GSM/UMTS/LTE signal strength inside buildings, fixed IT devices normally are not equipped with such location determination functionalities. Hence, ways of recording the locations of the fixed IT devices are sought. FIG. 2 illustrates two different ways of such a registration of the fixed IT devices' locations.

According to a first variant (FIG. 2A), which is suitable for workstations 4 and connected devices 3, the location of a certain fixed IT device can be (manually) recorded inside its print emulator configuration or another software routine when the fixed IT device is first installed. When the print emulator on that workstation 4 starts, it detects the connected devices 3 at 20. At 21, it reads out its workstation ID, its location and—in case of differing locations of the peripheral devices 3—the locations of the connected devices 3 from the print emulator configuration file. At 22, it sends these locations to the device server 2 and thereby registers itself and the peripheral devices 3.

The other option (FIG. 2B) is to register a fixed IT device by using the mobile communication device 1. In order to do this, the roaming user physically goes to the fixed IT device in question. At 23, the fixed IT device is identified, either by typing its full identity and/or location (e.g., QF/A/SYD/T/1/GTE/1/1) or by electronically reading it, e.g., by using a 2D bar code. The user then uses the location determination functionality of his/her mobile communication device 1 to acquire her/his current position in form of geo-spatial coordinates at 24. S/he then, at 25, sends the fixed IT device's ID, location and potentially other data such as the airport zone to the device server 2 and thereby registers the fixed IT device (and possibly connected peripheral devices 3) at the device server 2.

Figure 2A:
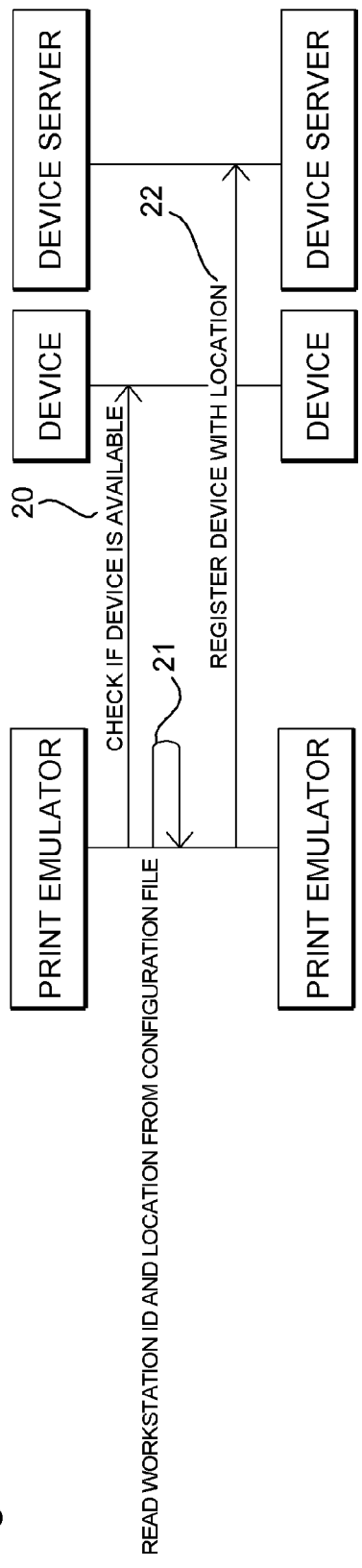
FIGS. 2A and 2B are exemplary message sequence charts of fixed device location registration.
Figure 2B:
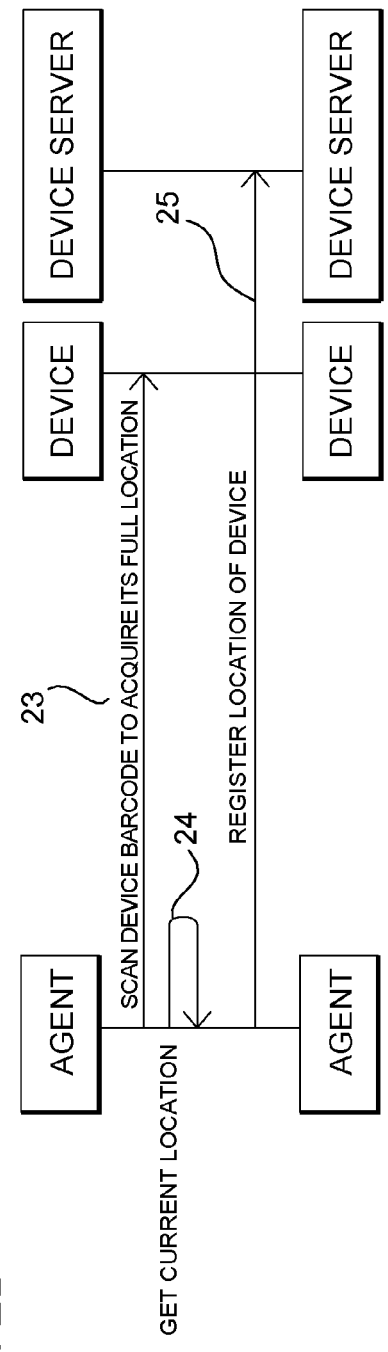
Figure 3:
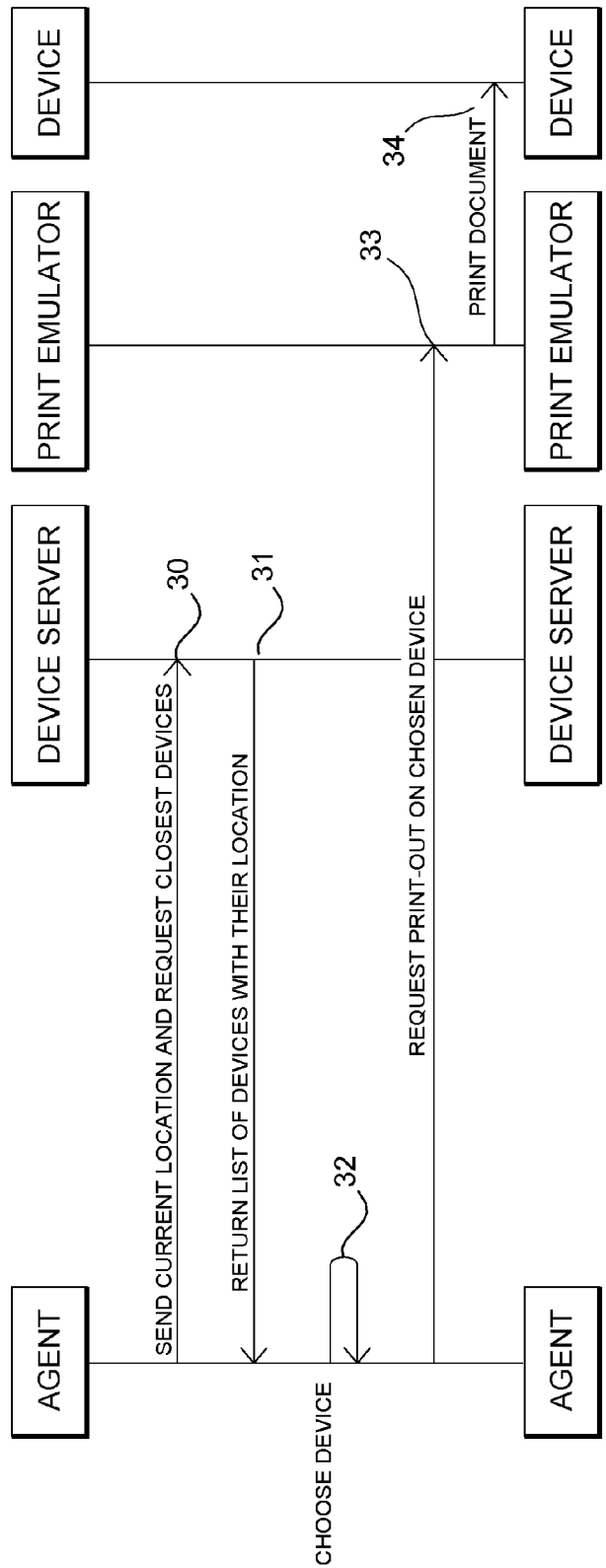
FIG. 3 illustrates an exemplary message sequence of utilizing a fixed device by a mobile communication device.

The localization and registration variants presented by FIGS. 2A and 2B establish a complete repository of the fixed IT devices at the device server 2. The location of the fixed IT devices being stored by the device server 2, the fixed IT devices can be used by any roaming agent using her/his mobile communication device 1. For example, an agent may need to print a document using a stationary printer in the vicinity, for example to reprint a customer's boarding pass, the customer standing in front of the agent. S/he can look for the closest printer to her/his current location, print the boarding pass and give it quickly to the customer. The message flow of this operation includes (cf. FIG. 3) the mobile communication device 1—after having determined its current location—sending its current location to the device server 2 and including a request for the closest fixed IT device, more specifically the closest printer at 30. At 31, device server 2 returns the requested list of printers in the vicinity of the mobile communication device 1. Should the list include more than one fixed IT devices, the agent (or the mobile communication device 1 automatically) selects one at 32. At 33, a print-out request is transmitted from the mobile communication device 1 to the chosen printer, more specifically to its print emulator. Finally, at 34, the print emulator of the fixed IT device initiates printing the requested document and the document is printed. The agent can then physically go to the printer, take the printed document and hand it over to the customer. Note that this operation does not require any form of mobility management for the mobile communication devices 1. Of course, a similar message flow applies to any other type of processing request by the mobile communication device 1 which is to be executed by a fixed IT device in the vicinity of the mobile communication device 1. Such other processing requests could, for example, include sending email-like messages to a certain workstation 4, displaying information at a particular information display, requesting any kind of information from a certain workstation 4 etc.

Figure 4:
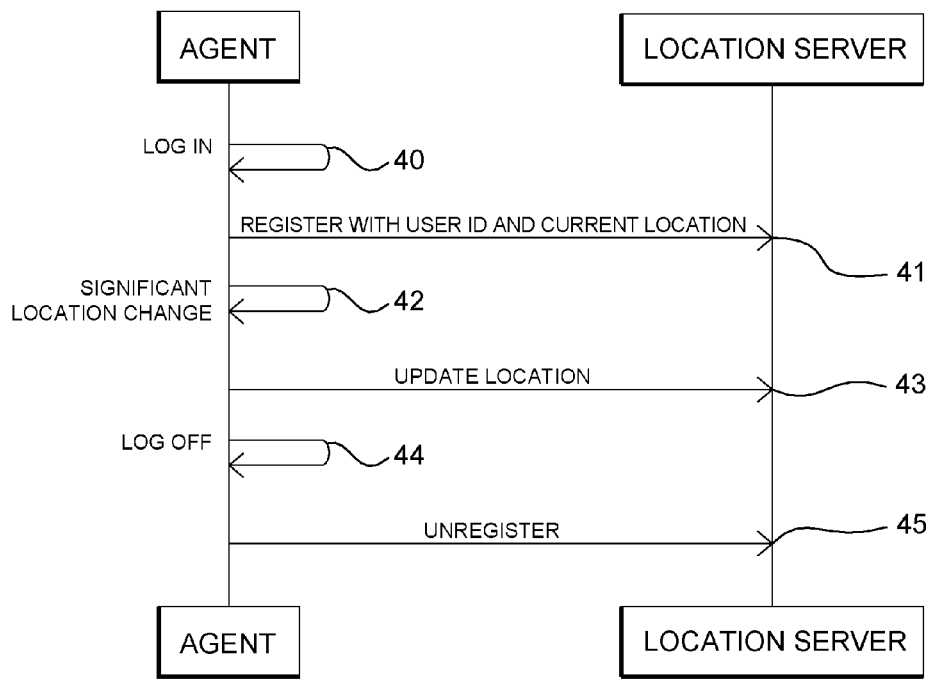
FIG. 4 depicts an exemplary message sequence for registering a mobile communication device.

As already described above in connection with FIG. 1, the location server 5 maintains a location inventory of the mobile communication devices 1 roaming through the area (FIG. 4). After activation, boot or login, a mobile communication device 1 (at 40) registers itself at the location server at 41. With this registration message, user and/or device ID and the initial current location of mobile communication device 1 is transmitted to the location server. Whenever a significant location change is detected, the mobile communication device 1 updates its position with the location server 5 at 43. What classifies a location change as significant is a matter of configuration or settings. For example, a predetermined distance could be pre-configured or set. Accordingly, the mobile communication devices 1 are configured to continuously or regularly monitor their current locations and consider a location change of the predetermined distance, e.g., 10 or 20 meters, compared to the previous registered location as "significant". As today's tablet computers and devices as well as smartphones are usually equipped with location tracking sensors, such a significant location change is preferably detected by using these movement sensors of the mobile communication device 1. This saves the mobile communication devices' 1 battery life, compared to a location change determination by constantly tracking its location via GPS or Wi-Fi/GSM/UMTS/LTE triangulation or the like. As a side effect, this also protects the agent's privacy as her/his location is not continuously or very precisely recorded by the location server 5. When the agent either exits the DCS application running on the mobile communication device 1, logs off from the mobile communication device 1 and/or the device 1 is shut down at 44, a deregistering from the location server 5 takes place at 45.

Figure 5:
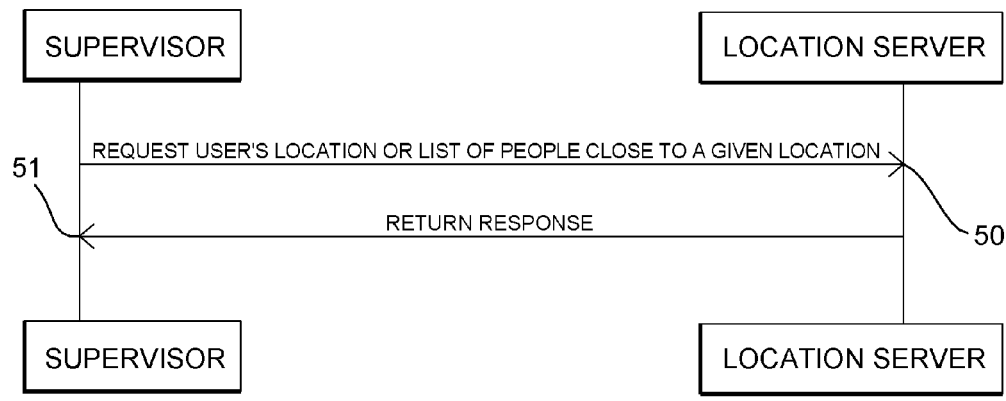
FIG. 5 shows an exemplary message sequence for tracking registered mobile communication devices.

The mobility management provided by the location server 5 can be utilized in order to easily manage or instruct the roaming agents or the staff personal. For example, as shown by FIG. 5, at 50, a supervisor may request the location of a particular agent/staff member;

a list of agents/staff members at or around a particular location; or the agents/staff members who are currently located in a particular zone.

This request includes either a user or mobile communication device ID or a particular location in form of 3D geospatial coordinates, a fixed IT device ID or a point of interest. The supervisor herself/himself can use a mobile communication device 1 and can be roaming through the area. Alternatively, the supervisor can also utilize a stationary workstation 4 for her/his request. In response to the request, the location server 5 returns an appropriate response indicating the location(s) of the respective agent(s)/staff member(s) at 51.

The previously discussed use-cases, i.e., the mobile communication device 1 interacting with a nearby fixed IT device (FIG. 3) and localizing mobile communication devices 1 by a supervisor (FIG. 5), which are based on top of the basic functions of recording locations of fixed IT devices with the device server 2 (FIG. 2) and location management of the mobile communication devices 1 by the location server 5 (FIG. 4), have been described without elaborating on their presentation on the mobile communication device 1 to the user. Several variants of presentation are thinkable. A normal approach would be a text-based presentation, e.g., in form of lists, from which an agent or a supervisor can choose the desired fixed IT device or located agent. An enhanced approach providing increased value to the user is a map-based presentation. This will be described in more detail subsequently with reference to FIGS. 6 to 8. Moreover, the mobility of the mobile communication device 1 and the usual availability of various equipment and sensors (such as a camera, position and orientation sensors) enable the creation of augmented reality contents. A third approach thus combining reality and virtual reality is a camera-based presentation on which will be focused in connection with FIGS. 9 and 10.

According to the map-based approach, a map is displayed on the mobile communication device's screen, showing the user's current position and orientation, as well as other devices' location (FIG. 6). The map-based presentation can be used to support the interaction between a mobile communication device 1 and the fixed IT devices as it was disclosed above in connection with FIG. 3. For example, it offers the user a more friendly way to select a printer at which s/he wishes to print a document, or it helps her/him find the way to a selected printer in order to get hold of the printed documents. The map generation at the mobile communication device 1 is supported by the location server 5 which—as already outlined above—contains maps of the airport with points of interests.

At 60 (in FIG. 6A), the agent, i.e., the mobile communication device 1, sends a query to the device server 2 requesting an overview of relevant fixed IT devices close to its current location. The device server 2 responds accordingly at 61 with a list of fixed IT devices and their locations. The mobile communication device 1 then hands over this information to the location server 5 with message 62. In response, at 63, the location server 5 returns the map data showing locations of the agent/the mobile communication device 1 and the fixed IT devices. The mobile communication device 1 displays the map on its display. The agent can then, at 64, click on the map to select a particular fixed IT device and, at the same time, to send the request to the selected fixed IT device at 65. As the example of FIG. 6A refers to a print request, the request 65 will be specifically sent to the fixed IT device's print emulator. Finally, the request is processed by the fixed IT device at 66, e.g., the print emulator initiates the print process with the printer. Optionally, the fixed IT device can return a positive acknowledgement or, in the exceptional case of a failure, a failure indication to the mobile communication device (not shown in FIG. 6A).

An exemplary look-alike of a corresponding map 67 including the visualization 68 of the agent, her/his location and orientation, the visualizations of surrounding printers including the selected printer 69 and other points of interests, is depicted by FIG. 6B.

Figure 7:
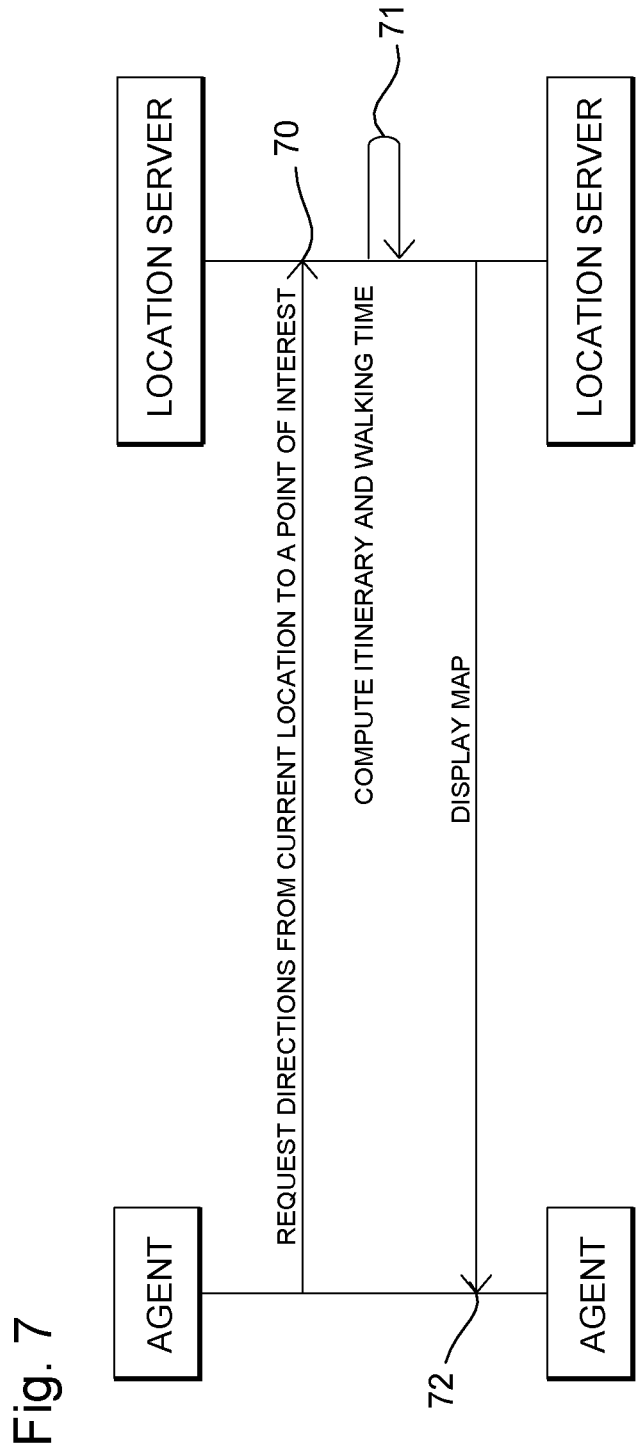
FIG. 7 shows an example of navigation assistance to a mobile communication device using a map.

Another application of the map-based approach enables (airline) agents to show customers how to reach their boarding gate (FIG. 7). Airports usually provide information to passengers about the minimum connecting time between two flights based on the arrival gate of the first flight and the departure gate of the second one. Using the map on her/his mobile communication device 1, roaming agents are able to provide this information to passengers on the go and to show them how and where to proceed.

At 70 (in FIG. 7), the mobile communication device 1 transmits a request for walking directions from its current position to a particular point of interest. Alternatively, the mobile communication device 1 is able to include any other location into the request. Such alternative location may be described as 3D geospatial coordinates or a point of interest. For example, such an alternative location could be manually entered by the user of the mobile communication device 1, e.g., by entering a location on a map or by typing it in. Request 70 contains an identification of the point of interest in question and preferably, but not necessarily, the current position of the mobile communication device 1 as starting point of the navigation (alternatively, the location server uses the last known current position of the mobile communication device 1 as the starting point). The location server then, at 71, computes a route from the starting point to the destination along with corresponding walking times and returns the corresponding navigation and map data to the mobile communication device 1 at 72, which then displays the map accordingly.

Figure 8A:
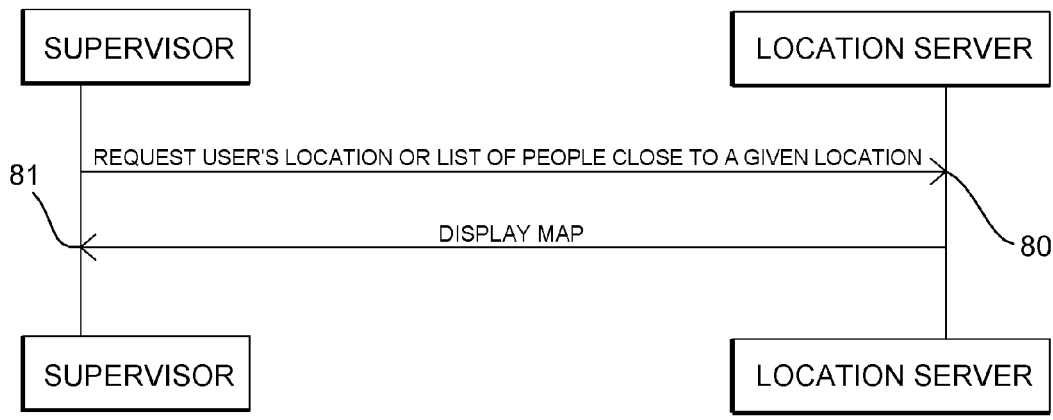
FIGS. 8A and 8B depict an exemplary personal management use-case using a map.

A further use-case of the map-based approach is the supervision of agents by a supervisor which was already described in connection with FIG. 5. As the location server 5 keeps track of the mobile communication devices' 1 locations, a supervisor—having the respective permissions—can be provided with a display of their positions on its own mobile communication device 1 or workstation 4 by use of a map (FIG. 8A).

To establish such a map, the device of the supervisor transmits a request 80 for the location of a particular agent or for a list of agents around a specified location to the location server 5. The location server 5 returns respective map data at 81. The supervisor's device 1 or 4 generates the map.

Figure 8B:
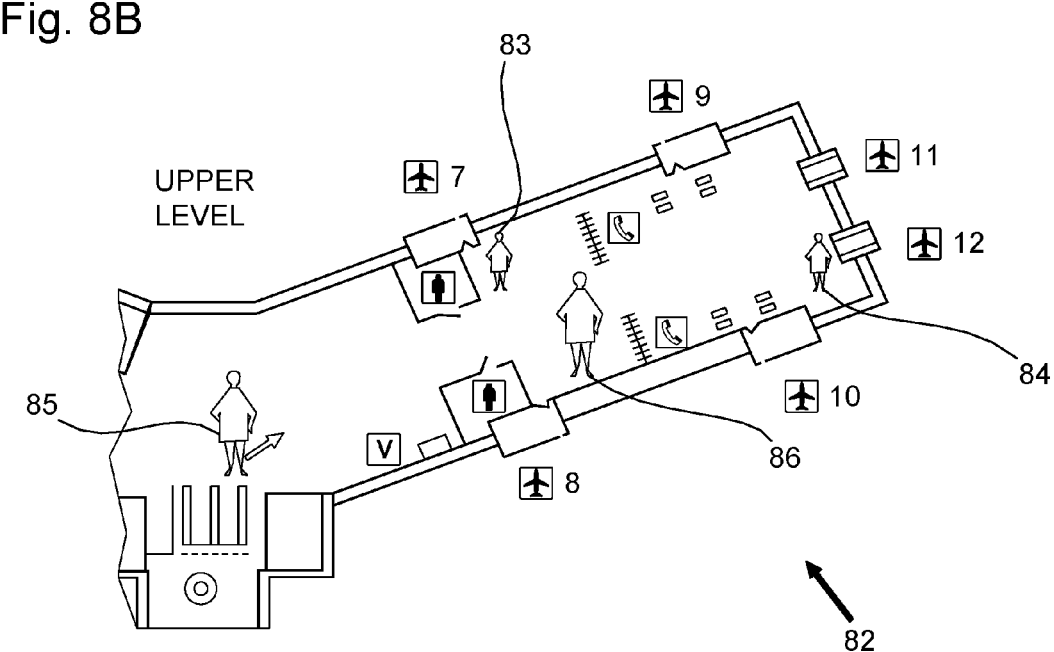

An exemplary result of such a map 82 is shown by FIG. 8B. The map 82 visualizes the supervisor 86 itself, a particular agent 85, agents 83 and 84 in the vicinity of the supervisor and points of interest such as gates, telephone cells, restrooms and the like.

Another user-case of the map-based representation approach is directed to a supervisor managing various information which can be presented to her/him at a map. An example in the present airport example might be a supervisor managing several flights. Such a supervisor can subscribe to messenger notifications regarding those flights managed by her/him and respective flight data. The supervisor's mobile communication device 1 is arranged to get location data concerning the flights such as the respective boarding gates. S/he can then use the boarding gates' location to display location-related notifications on the map, i.e., the flight information is presented on the map at the correct location such as the boarding gates where the flights are departing from. Additionally using her/his current location, s/he can see which one is the closest to her/him and what is the best way to go there.

Figure 9A:
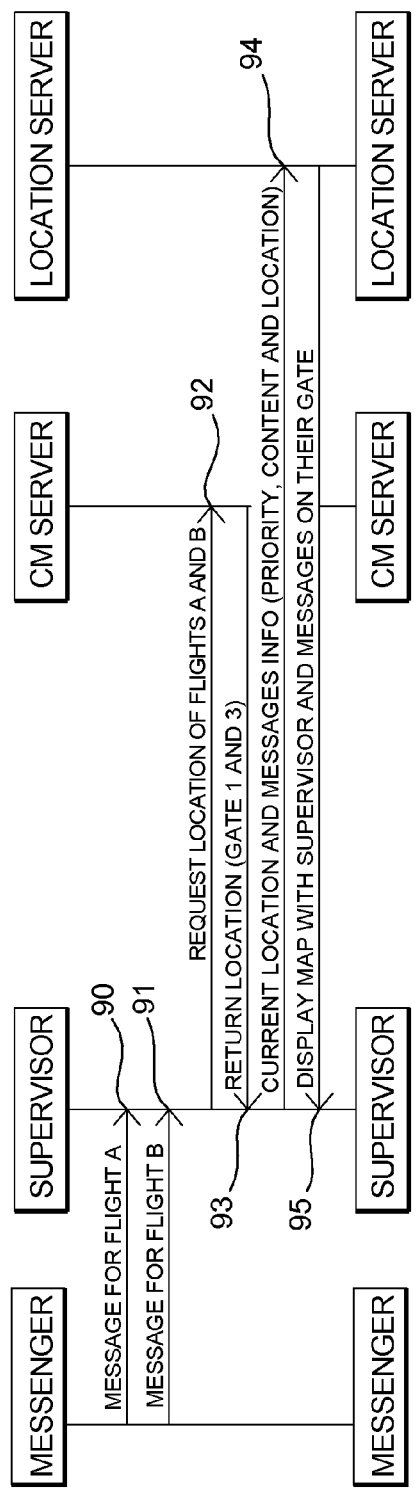
FIGS. 9A and 9B illustrate an example information presentation to a supervising mobile communication device.

The respective message flow for this use-case is shown by FIG. 9A. The supervisor is subscribed to a messaging application which is running on a server of the fixed part of the network. With messages 90 and 91, the mobile communication device 1 (or the workstation 4) of the supervisor receives messages concerning flight A and B including flight-related information, for example a delay of flight A and a cancellation of flight B. These messages may be pushed to the supervisor's device or pulled by the supervisor's device at regular intervals. To get hold of the location data relevant for flights A and B, the mobile communication device 1 communicates with the customer management server 6 (referred to as "CM" in FIG. 9A) which holds a flight inventory including assigned boarding gates. After having directed a respective request 92 to the customer management server 6, the customer management server 6 returns the requested location information at 93. In order to receive the relevant map data, the mobile communication device 1 finally communicates with location server 5. Request 94 contains the current location of the supervisor and flight related information such as the content of the delay and cancellation and identifications of the boarding gates. Based on the this information, the location server 5 generates and returns the map data at 95 including the content information placed at a suitable location of the map and the supervisor's device displays the map. Alternatively, request 94 does not contain the flight related information, but this is incorporated into the map data received from the location server 5 only locally at the mobile communication device 1.

Figure 9B:
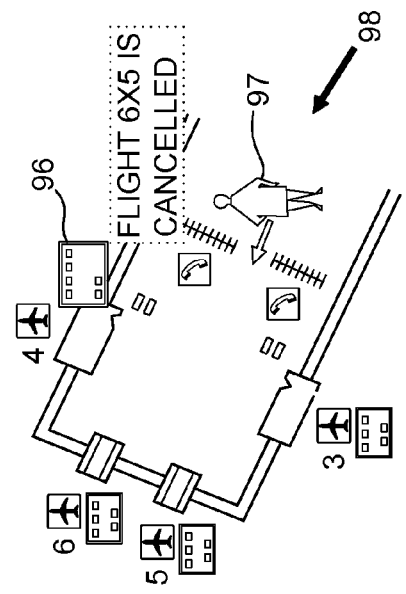

A map example 98 is shown by FIG. 9B. It includes a visualization of the roaming supervisor 97 and a notification 96 indicating that flight 6X5 planned to depart from gate number 4 has been cancelled.

Now turning to the camera-based augmented reality techniques, a level of information can be overlaid as a virtual overlay on top of the images captured by the camera of the mobile communication device 1. This feature gives the possibility of reaching a favourite place in a more interesting, innovative and user-friendly way. For instance, instead of looking for the facilities location on a standard 2D map, a user/agent can see directly from the picture taken by the camera of her/his mobile communication device 1 the direction and the distance between her/his position and the place of interest or destination. When pointing the camera of the mobile communication device 1 towards a point of interest, available relevant information is overlaid on the picture captured from the camera (FIG. 10).

Figure 10A:
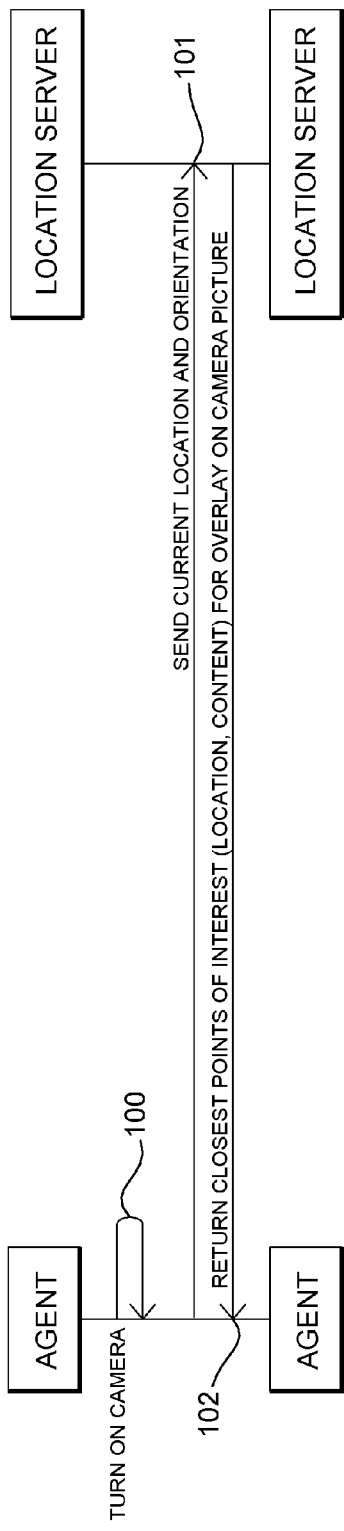
FIGS. 10A and 10B visualize an example of navigation assistance to a mobile communication device using augmented reality mechanisms.

Similar to the map-based presentation described above, the location server 5 is responsible for providing the virtual overlay data to the mobile communication device 1 (FIG. 10A). As a first step 100, the user activates the mobile communication device's 1 camera. At 101, the mobile communication device 1 sends its current location and orientation to the location server 5 and requests virtual overlay information. The location server 5 returns the location and the overlay content regarding the closest points of interests at 102. The content information may be either kept in the location server 5 itself or, alternatively, in the customer management server 6. In the latter case, the mobile communication device 1 or the location server 5 request the respective data from the customer management server 6 (not shown in FIG. 10A). Finally, the mobile communication device 1 generates the overlay layer depending on its location and orientation and presents the camera picture with the overlay to the agent.

Figure 10B:
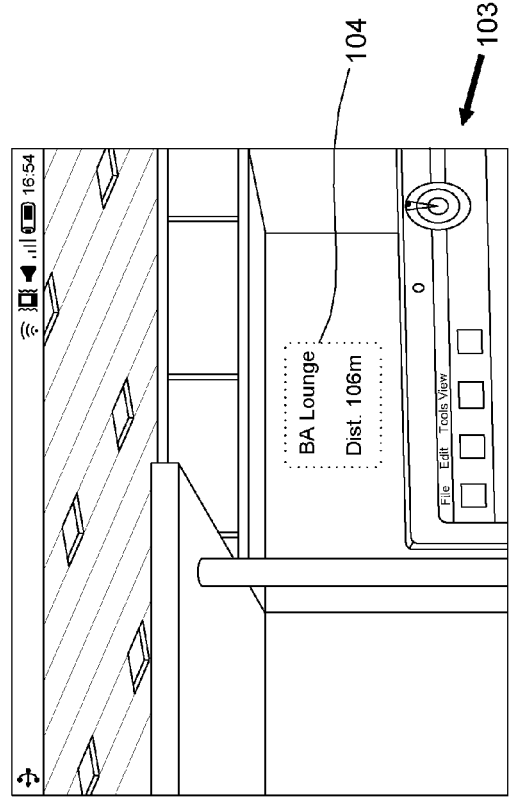

An example camera picture 103 overlaid with the additional virtual content 104 is shown by FIG. 10B. In this example, additional virtual content 104 is a virtual information board that is overlaid indicating the direction and distance to the intended destination, the BA Lounge. The virtual overlay modus is indicated to the user by the radar on the lower right hand side of the screen.

Another use-case of the camera-based presentation allows an agent to superimpose information such as flight information by pointing his camera towards a point of interest such as a boarding gate from which a particular flight is going to depart (FIG. 11).

Figure 11A:
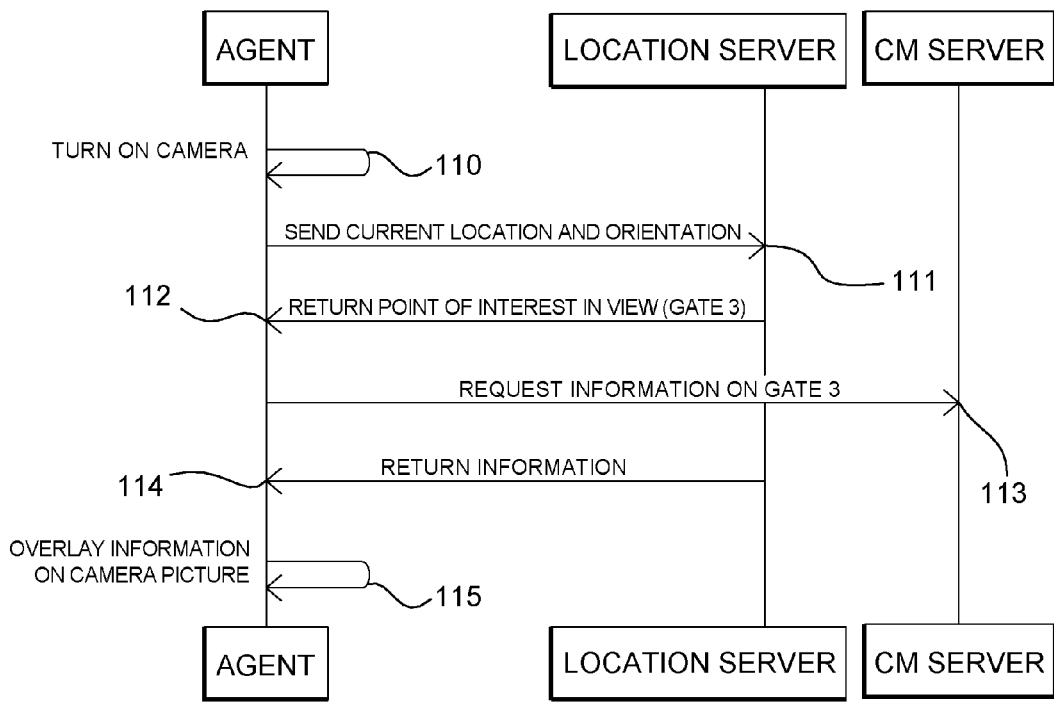
FIGS. 11A and 11B illustrate an example of information presentation to a mobile communication device using "augmented reality" mechanisms.

Steps 110 through 112 of FIG. 11A correspond to steps 100 through 102 of FIG. 10A. The camera of the mobile communication device 1 is activated at 110, the mobile communication device 1 transmits its current location and orientation to the location server 5 at 111 and the location server 5 returns the point of interest in view, e.g., Gate number 3, at 112. In order to get hold of the flight information currently related with Gate number 3, the mobile communication device 1 then communicates with the customer management server 6. At 113, it requests the content information regarding Gate number 3 from the customer management server 6. The customer management server 6 returns the requested information at 114. Finally, the mobile communication device 1 superimposes the content information over the camera picture as a virtual overlay at 115.

Figure 11B:
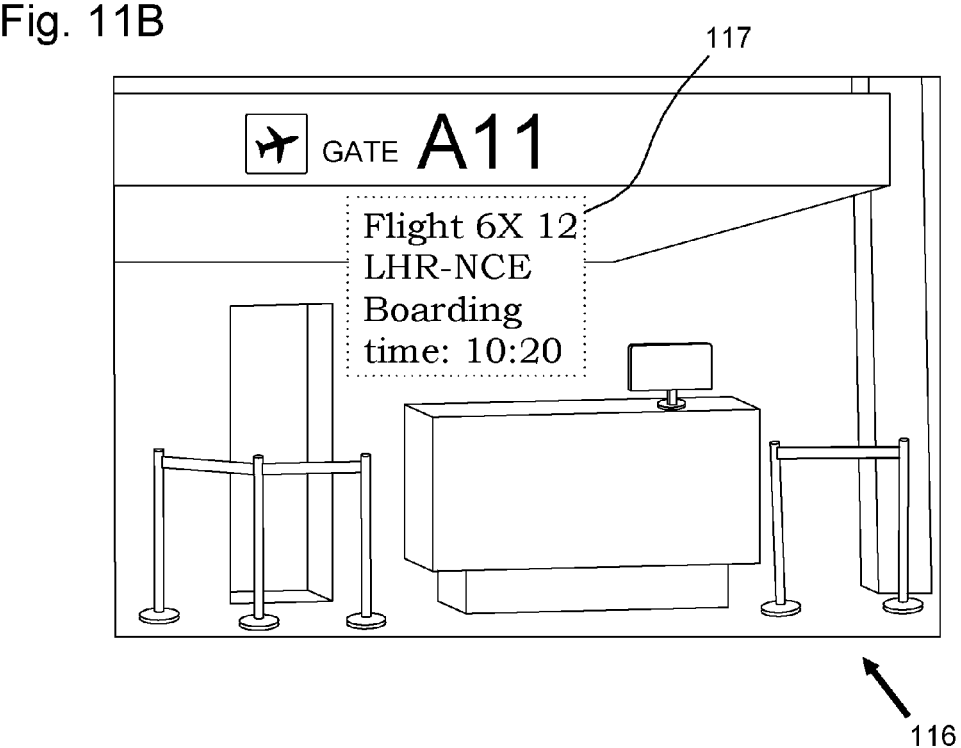

FIG. 11B illustrates an exemplary camera picture 116 with an overlay layer 117. The camera of the mobile communication device 1 points to Gate A 11 of London Heathrow Airport and the relevant information connected with this gate, namely that flight 6X 12 assigned to Gate A 11 is scheduled to Nice with a boarding time of 10:20 is faded in as a virtual layer at the position of the real-life information screen.

Figure 12:
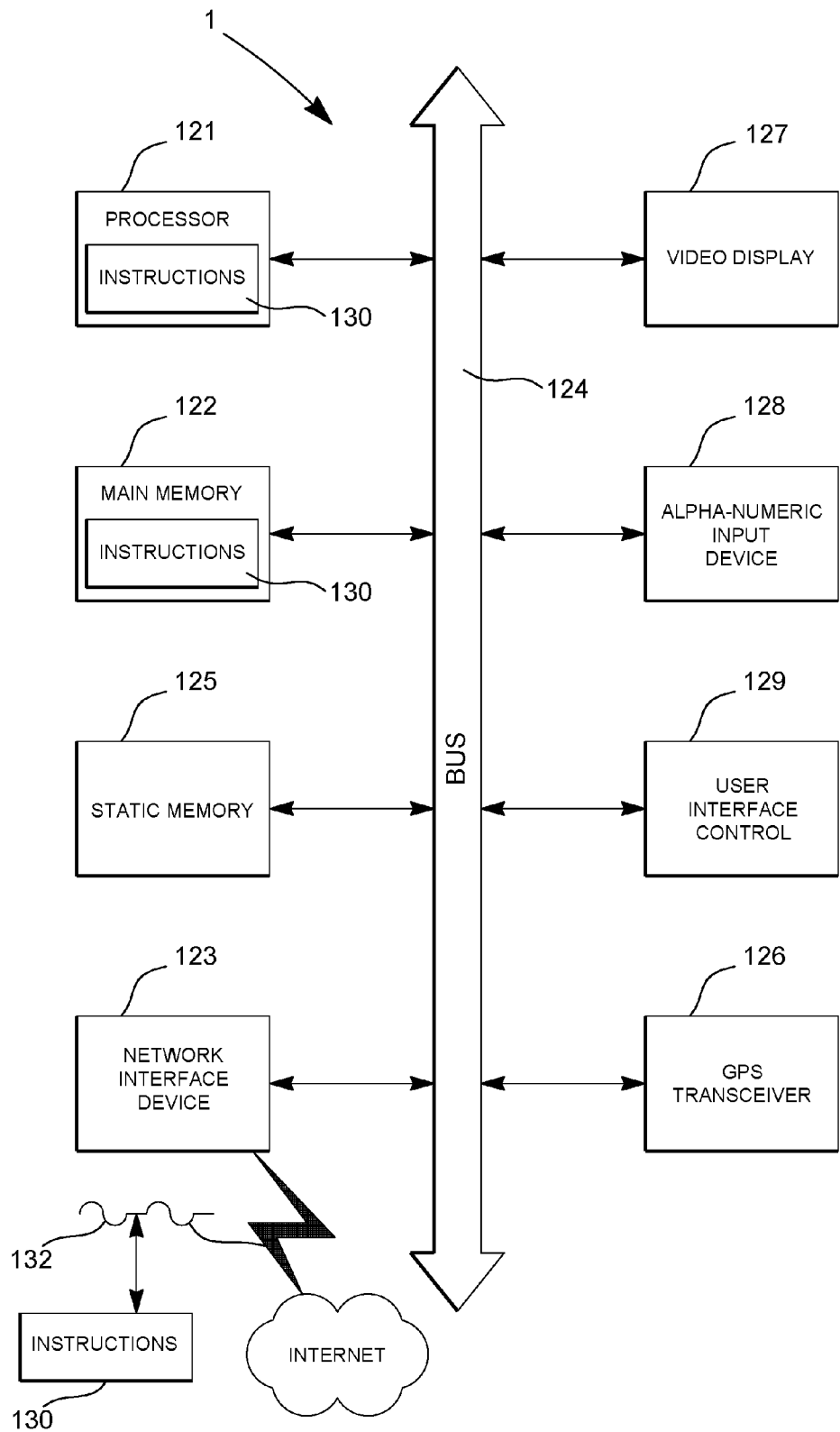
FIG. 12 is an exemplary schematic view of the internal architecture of a mobile communication device or a fixed device.

Finally, FIG. 12 is a diagrammatic representation of the internal structure of a mobile communication device 1. The mobile communication device 1 is arranged to execute a set of instructions, to cause it to perform any of the methodologies discussed herein. The mobile communication device includes a processor 121, a main memory 122 and a wireless network interface device 123 (such as a Wi-Fi and/or Bluetooth interface) and/or a 2G/3G/4G mobile network interface device (not shown), all of which communicate with each other via a bus 124. It further includes a static memory 125, e.g., non-removable flash or solid state drive or a removable Micro or Mini SD card, which permanently stores the software enabling the mobile communication device 1 to communicate with the fixed IT devices and the servers of the stationary part of the network (in the example of FIGS. 1 to 11 the DCS). Furthermore, it includes a display 127, preferably a touch screen, a user interface (touch screen) control module 129 and, optionally, an additional (non-virtual) alpha-numeric and cursor input device 128. The wireless network interface device 123 connects the mobile communication device 1 to the fixed IT devices and the servers of the stationary part of the network (in the example of FIGS. 1 to 11 the DCS). An optional GPS transceiver 126 provides for an additional possibility of location determination. A set of instructions (i.e., software) 130 embodying any one, or all, of the methodologies described above, resides completely, or at least partially, in the static memory 125. When being executed, respective instructions and/or data reside in the main memory 122 and/or the processor 121. The software 130 may further be transmitted or received as a propagated signal 132 through the wireless network interface device 123 or the 2G/3G/4G mobile network interface from/to the a server within the network depicted by FIG. 1 or the Internet.

Device server 2, location server 5 and workstations 4 are constructed in a similar way with the exception that they may not have any wireless network interfaces and GPS modules.

Each computing system described herein, also referred to as a platform, client, server, or back end, may include at least one processing unit configured to execute one or more instructions to perform one or more operations consistent with embodiments of the invention. Each computing system generally includes an input/output ("I/O") interface, a display, and external devices. The I/O interface may be configured to receive data from the display and data from the external devices that is communicated to the processing unit and may be configured to output data from the processing unit to the display and external devices. The display may be, for example, a computer monitor or a screen on a mobile phone or a tablet. Alternatively, the display may be a touch screen that not only functions to permit a user to receive and view output data, but also functions to permit the user to input data with, for example, an onscreen virtual keyboard. The external devices may include, for example, additional user input devices such as a keyboard, a keypad, a mouse, a microphone, etc., and additional user output devices such as speakers, etc. The computing system may also include a network adapter, such as a network interface card or a transceiver, that supplies the physical connection with a network and that is configured to transmit data and receive over the network.

Each computing system includes a memory configured to store one or more software modules or applications and/or an operating system, where each application and the operating system each generally comprise one or more instructions stored as program code that may be read from the memory by each processing unit. The instructions, when executed by the processing unit, may cause the processing unit to perform one or more operations to thereby perform the steps necessary to execute steps, elements, and/or blocks embodying the various embodiments of the invention.

The memory may represent random access memory (RAM) comprising the main storage of a computer, as well as any supplemental levels of memory, e.g., cache memories, non-volatile or backup memories (e.g., programmable or flash memories), mass storage memory, read-only memories (ROM), etc. In addition, the memory may be considered to include memory storage physically located elsewhere, e.g., cache memory in a processor of any computing system in communication with the client device 16, as well as any storage device on any computing system in communication with the client device 16 (e.g., a remote storage database, a memory device of a remote computing device, cloud storage, etc.).

The routines and/or instructions that may be executed by the one or more processing units to implement embodiments of the invention, whether implemented as part of an operating system or a specific application, component, program, object, module, interface, engine element, tool, or sequence of operations executed by each processing unit, will be referred to herein as "program modules", "computer program code" or simply "modules" or "program code." Generally, program modules may include routines, programs, objects, components, logic, data structures, and so on that perform particular tasks or implement particular abstract data types. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Given the many ways in which computer code may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The flowcharts, block diagrams, and sequence diagrams herein illustrate the architecture, functionality, and operation of possible implementations of systems, methods, and computer program products according to various embodiments of the present invention. In this regard, each block in a flowchart, block diagram, or sequence diagram may represent a segment or portion of program code, which comprises one or more executable instructions for implementing the specified logical function(s) and/or act(s). Program code may be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the blocks of the flowcharts, sequence diagrams, and/or block diagrams herein. In certain alternative implementations, the functions noted in the blocks may occur in a different order than shown and described. For example, a pair of blocks described and shown as consecutively executed may be instead executed concurrently, or the two blocks may sometimes be executed in the reverse order, depending upon the functionality involved. Each block and combinations of blocks can be implemented by special purpose hardware-based systems that perform the specified functions or acts, or combinations of special purpose hardware and computer instructions.

The program code of any of the embodiments described herein is capable of being individually or collectively distributed as a program product in a variety of different forms. In particular, the program code may be distributed using a computer readable media, which may include computer readable storage media and communication media. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicants' general inventive concept.

The invention claimed is:

1. A method for coupling a mobile communication device with a fixed communication network including a device server and a plurality of information technology (IT) devices each having identification information registered at the device server, the method comprising:
   determining a current location of the mobile communication device;
   sending, from the mobile communication device over a wireless communication link with the fixed communication network, the current location of the mobile communication device and a request for the identification information for the IT devices from the device server;
   receiving the identification information for one or more of the IT devices at the mobile communication device over the wireless communication link with the fixed communication network from the device server; and based upon the identification information, transmitting a service request from the mobile communication device over the wireless communication link with the fixed communication infrastructure to one of the IT devices for which the identification information is received.

2. The method of claim 1 wherein the mobile communication device is a first mobile communication device, and further comprising:

registering the identification information of the first mobile communication device and the current location of the first mobile communication device at a location server of the fixed communication network; and in response to a change in the current location of the first mobile communication device, updating the current location of the first mobile communication device at the location server.

3. The method of claim 2 further comprising:

communicating a first request for a current location of a second mobile communication device registered with the fixed communication network from the first mobile communication device over the wireless communication link with the fixed communication network to the location server; and in response to the first request, receiving, at the first mobile communication device, the current location of the second mobile communication device over the wireless communication link with the fixed communication network from the location server.

4. The method of claim 2 wherein location information for each of the IT devices is registered at the location server, and further comprising:

transmitting the current location of the first mobile communication device and a current orientation of the first mobile communication device over the wireless communication link with the fixed communication network to the location server; and receiving, at the first mobile communication device, the location information regarding at least one of the IT devices over the wireless communication link with the fixed communication network from the location server.

5. The method of claim 4 wherein the first mobile communication device comprises a camera, and further comprising:

displaying an image taken by the camera on the first mobile communication device; and overlaying a virtual representation of the location information for at least one of the IT devices on the image.

6. The method of claim 4 wherein the fixed communication network further comprises a content management server, content information regarding at least one of the IT devices is registered at the location server, and further comprising:

communicating a second request for the content information regarding the at least one of the IT devices from the first mobile communication device over the wireless communication link with the fixed communication network to the content management server; and in response to the second request, receiving, at the first mobile communication device, the content information over the wireless communication link with the fixed communication network from the content management server.

7. The method of claim 6 wherein the first mobile communication device comprises a camera, and further comprising:

displaying an image taken by the camera on the first mobile communication device; and overlaying a virtual representation of the location information and the content information for the at least one of the IT devices on the image.

8. The method of claim 1 wherein the identification information of each of the IT devices includes a location of the IT device, and further comprising:

receiving the location of each of the IT devices from the device server over the wireless communication link with the fixed communication network at the mobile communication device; and communicating the current location of the mobile communication device, a current orientation of the mobile communication device, and the location of each of the IT devices from the mobile communication device over the wireless communication link with the wireless communication link to a location server of the fixed communication network.

9. The method of claim 8 further comprising:

receiving, at the first mobile communication device, map information regarding the mobile communication device and each of the IT devices from the location server over the wireless communication link with the fixed communication network; and based upon the map information, displaying a map representation on the mobile communication device indicating the current location of the mobile communication device and the location of one or more of the IT devices.

10. The method of claim 9 wherein further comprising:

selecting one of the IT devices from the map representation.

11. The method of claim 1 further comprising:

allowing the IT device receiving the transmitted service request to service the service request.

12. The method of claim 1 further comprising:

registering the identification information of the mobile communication device and the current location of the mobile communication device at a location server of the fixed communication network;

transmitting a navigation request from the mobile communication device over the wireless communication link with the fixed communication network to the location server for navigation information from the current location to a destination;

computing the navigation information at the location server;

communicating the navigation information from the location server over the wireless communication link with the fixed communication network to the mobile communication device; and displaying a map representation on the mobile communication device indicating the current location, the destination, and the navigation information.

13. A computer program product comprising:

a non-transitory computer readable storage medium; and computer executable instructions stored on the non-transitory computer readable storage medium and configured upon execution to perform the method of claim 1.

14. An apparatus for use with a fixed communication network including a device server and plurality of information technology (IT) devices each having identification information registered at the device server, the apparatus comprising:

a mobile communication device coupled by a wireless communication link with the fixed communication network, the mobile communication device including at least one processor and a memory coupled to the at least one processor, the memory including instructions that, when executed by the at least one processor, cause the apparatus to:

determine a current location of the mobile communication device;

send the current location of the mobile communication device and a request for the identification information for the IT devices over the wireless communication link with the fixed communication network to the device server;

receive the identification information for one or more of the IT devices over the wireless communication link with the fixed communication network from the device server; and transmit a service request, based upon the identification information, over the wireless communication link with the fixed communication infrastructure to one of the IT devices for which the identification information is received.

15. The apparatus of claim 14 wherein the mobile communication device is a first communication device, and the instructions, when executed by the at least one processor, cause the apparatus further cause the apparatus to:

register the identification information of the first mobile communication device and the current location of the first mobile communication device at a location server of the fixed communication network; and in response to a change in the current location of the first mobile communication device, update the current location of the first mobile communication device at the location server.

16. The apparatus of claim 15 wherein the instructions, when executed by the at least one processor, cause the apparatus further cause the apparatus to:

communicate a first request for a current location of a second mobile communication device registered with the fixed communication network from the first mobile communication device over the wireless communication link with the fixed communication network to the location server; and in response to the first request, receive, at the first mobile communication device, the current location of the second mobile communication device over the wireless communication link with the fixed communication network from the location server.

17. The apparatus of claim 15 wherein the instructions, when executed by the at least one processor, cause the apparatus further cause the apparatus to:

register the identification information of the first mobile communication device and the current location of the first mobile communication device at the location server;

transmit the current location of the first mobile communication device and a current orientation of the first mobile communication device over the wireless communication link with the fixed communication network to the location server; and receive, at the first mobile communication device, location information regarding at least one of the IT devices over the wireless communication link with the fixed communication network from the location server.

18. The apparatus of claim 17 wherein the first mobile communication device comprises a camera, and the instructions, when executed by the at least one processor, cause the apparatus further cause the apparatus to:

display an image taken by the camera on the first mobile communication device; and overlay a virtual representation of the location information for at least one of the IT devices on the image.

19. The apparatus of claim 17 wherein the fixed communication network further comprises a content management server, and the instructions, when executed by the at least one processor, cause the apparatus further cause the apparatus to:

communicate a second request for content information regarding the IT device from the first mobile communication device over the wireless communication link with the fixed communication network to the content management server; and in response to the second request, receive, at the first communication device, the content information over the wireless communication link with the fixed communication network from the content management server.

20. The apparatus of claim 19 wherein the first mobile communication device comprises a camera, and the instructions, when executed by the at least one processor, cause the apparatus further cause the apparatus to:

display an image taken by the camera on the first mobile communication device; and overlay a virtual representation of the location information for at least one of the IT devices and the content information on the image.

21. The apparatus of claim 14 wherein the IT device comprises a work station, a printer, a scanner, an information display, a copier, or a fax machine.

22. The apparatus of claim 14 wherein the mobile communication device comprises a mobile telephone, a smartphone, a notebook, or a tablet computer.

23. The apparatus of claim 14 wherein the IT device comprises a printer, and the service request is a print request.

24. The apparatus of claim 14 wherein the fixed communication network comprises a departure control system implemented at an airport.

25. The apparatus of claim 14 wherein the instructions, when executed by the at least one processor, cause the apparatus further cause the apparatus to:

receive, at the first mobile communication device, a location of each of the IT devices from the device server over the wireless communication link with the fixed communication network; and communicate the current location of the mobile communication device, a current orientation of the mobile communication device, and the location of each of the IT devices over the wireless communication link with the fixed communication network to a location server of the fixed communication network.

26. The apparatus of claim 25 wherein the instructions, when executed by the at least one processor, cause the apparatus further cause the apparatus to:

receive, at the first mobile communication device, map information regarding the mobile communication device and each of the IT devices from the location server over the wireless communication link with the fixed communication network; and based upon the map information, display a map representation on the mobile communication device indicating the current location of the mobile communication device and the location of one or more of the IT devices.

27. The apparatus of claim 26 wherein the mobile communication device is configured for selecting the IT device from the map representation.

* * * * *

UNITED STATES PATENT AND TRADEMARK OFFICE
CERTIFICATE OF CORRECTION

PATENT NO. : 8,874,108 B2
APPLICATION NO. : 13/721578
DATED : October 28, 2014
INVENTOR(S) : David Orton et al.

Page 1 of 2

It is certified that error appears in the above-identified patent and that said Letters Patent is hereby corrected as shown below:

In the Specification:

At column 2, line number 64, change "fulfil" to --fulfill--

At column 3, line number 12, change "supported, neither by the infrastructure of a mobile communication network nor" to --supported by the infrastructure of a mobile communication network or--

At column 4, line number 34, change "personal" to --personnel-- and at line 51, change "application are" to --applications as--

At column 6, line number 50, change "fulfil" to --fulfill--

At column 8, line number 9, change "device" to --devices--

At column 13, line number 3, after "on" delete "the"

At column 14, line number 43, after "to" delete "the"

In the Claims:

At column 18, claim number 10, line number 29, after "9" delete "wherein"

At column 19, claim number 15, line number 24, delete the first occurrence of "cause the apparatus"

Signed and Sealed this
Seventh Day of April, 2015

Michelle K. Lee
*Director of the United States Patent and Trademark Office*

CERTIFICATE OF CORRECTION (continued)
U.S. Pat. No. 8,874,108 B2

In the Claims:

At Column 19, claim number 16, line number 33, after "processor," delete "cause the apparatus"

At Column 19, claim number 17, line number 47, after "processor," delete "cause the apparatus"

At Column 19, claim number 18, line number 64, after "processor," delete "cause the apparatus"

At Column 20, claim number 19, line number 8, after "processor," delete "cause the apparatus"

At Column 20, claim number 25, line number 39, after "processor," delete "cause the apparatus"

At Column 20, claim number 26, line number 53, after "processor," delete "cause the apparatus"